March 5, 1940.   G. H. UNDERHILL   2,192,761
MULTIPLEX PHOTOCELL TELEMETERING
Filed March 14, 1939   3 Sheets-Sheet 1

Fig. 1.

Inventor:
George H. Underhill,
by Harry E. Dunham
His Attorney

March 5, 1940.　　　G. H. UNDERHILL　　　2,192,761
MULTIPLEX PHOTOCELL TELEMETERING
Filed March 14, 1939　　　3 Sheets-Sheet 2

Inventor:
George H. Underhill,
by Harry E. Dunham
His Attorney

March 5, 1940.   G. H. UNDERHILL   2,192,761
MULTIPLEX PHOTOCELL TELEMETERING
Filed March 14, 1939   3 Sheets-Sheet 3

Inventor:
George H. Underhill,
by Harry E. Dunham
His Attorney

Patented Mar. 5, 1940

2,192,761

UNITED STATES PATENT OFFICE 2,192,761

MULTIPLEX PHOTOCELL TELEMETERING

George H. Underhill, Poughkeepsie, N. Y., assignor to General Electric Company, a corporation of New York Application March 14, 1939, Serial No. 261,733

6 Claims. (Cl. 177—351)

My invention relates to remote indicating and registering devices and concerns particularly apparatus for transmitting a plurality of indications or measurements over a single circuit or channel.

It is an object of my invention to produce a multiplex telemeter in which the use of rotating contacts is unnecessary.

It is also an object of my invention to produce a simplified, reliable operating system for indicating measurements at a distance.

Another object of my invention is to provide an impulse telemetering mechanism capable of operating at any desired speed.

It is still another object of my invention to provide remote indicating telemetering or supervisory systems in which the synchronization and phase relation of the impulses at the transmitting and receiving stations may be readily observed, checked, and corrected, and in which lack of synchronization or phase coincidence may cause an alarm which shuts down the apparatus automatically, or which may be utilized to restore phase coincidence automatically.

It is a further object of my invention to produce a telemetering system capable of utilizing any communication channel.

Other and further objects and advantages will become apparent as the description proceeds.

In carrying out my invention in its preferred form I utilize light sources intermittently illuminated at impulse rates corresponding to the magnitudes of measurements to be transmitted, together with photoelectric relays for converting the light flashes into electric impulses. Synchronously rotating disks are utilized at the transmitting and receiving stations for causing light responsive relays at the receiving station to be illuminated selectively in rotation in accordance with the energization of the lamps at the transmitting station by separate measuring devices. An additional lamp is provided at the transmitting station for synchronization purposes and a viewing screen is provided at the receiving station for observing the angular position of the flashes produced by the synchronization lamp in order to determine whether or not the transmitting and receiving stations are synchronized. A mechanical phase shifter is provided at the receiving station for making any necessary corrections and an additional light responsive relay is provided at the receiving station for giving an alarm or for shutting down the apparatus or for correcting the phase adjustment in case the receiving station falls out of step.

The invention will be understood more readily from the following detailed description when considered in connection with the accompanying drawings and those features of the invention which are believed to be novel and patentable will be pointed out in the claims appended hereto. In the drawings

For the sake of illustration I have shown in the drawings and have described hereinafter an embodiment of my invention suitable for transmitting four different indications over a single communication channel, although it will be understood that a considerably greater number of indications might be transmitted with the same type of apparatus as that shown in the drawings. For the sake of simplicity and to avoid confusion in the drawings, however, apparatus for transmitting one of the indications only has been fully shown and many of the duplicate parts for transmitting the remaining indications have been omitted from the drawings or have merely been indicated without their connections being completed.

In the specific telemetering system illustrated, readings from integrating devices such as watthour meters are transmitted to a distance and may, if desired, also be caused to operate demand meters. The system may be used, for example, for transmitting the readings of watthour meters and reactive energy meters connected in two different circuits or for each direction of power flow in the same circuit, thus making four different meters the readings of which are to be transmitted. To avoid unnecessary confusion in the drawings only one of such meters is shown at the transmitting station 10 and is represented schematically as a rotating disk integrating device 11 having a three-wire contact making device 12 mechanically connected to its shaft. A pair of lamps 13 and 14 is provided. They are so connected as to be energized alternately as the contact making device 12 is operated by the meter 11. A photoelectric device or tube 15 is provided which is adapted to be illuminated by the lamps 13 and 14 and shutter means in the form of a rotatable disk 16 having a single aperture is interposed between the lamps 13 and 14 and the phototube 15 so that light from only one lamp at a time falls upon the phototube 15. A transmission circuit is provided which may consist of a single telephone wire 17 constituting a telegraph channel of a communication system and the wire 17 is so connected as to have a current impulse transmitted thereover whenever the phototube 15 is illuminated (or is darkened).

At the receiving station 18 there is a lamp 19 which may be in the form of a neon tube ring or spiral and the lamp 19 is arranged to be controlled by the impulses transmitted over the communication wire 17. To correspond to the transmitting station lamps 13 and 14 there is a pair of photoelectric devices or tubes 20 and 21 at the receiving station. These phototubes are arranged to supply electric impulses whenever illuminated, to a distant dial, represented by its actuating coil 22, or to any other desired apparatus which is operable by polarized or selective impulses, in order to reproduce the readings of the meter 11 or to produce other indications dependent upon the readings or the rate of rotation of the meter 11. A single-aperture rotating-disk shutter means 23 is provided at the receiving station and is interposed between the neon ring 19 and the phototubes 20 and 21 so that only one of the phototubes is exposed to light at any given time.

The rotating disks 16 and 23 at the transmitting and receiving stations, respectively, are driven synchronously and in the proper phase in such a manner that the phototube 15 is exposed to the lamp 13 at the same time that the phototube 20 is exposed to the lamp 19, and the phototube 15 is exposed to the lamp 14 at the same time that the phototube 21 is exposed to the lamp 19. The speed of rotation of the disks is such that they make a complete revolution in less than the minimum length of time that either lamp 13 or 14 remains illuminated in response to the greatest speed of operation within the range of the meter 11. Consequently, the light impulses supplied to the receiver phototubes 20 and 21 alternate at the same speed as the three-wire contact 12 alternates the energization of the lamps 13 and 14. The apparatus controlled by the phototubes 20 and 21 may be of the well known type which advances only in response to alternately received impulses so that the action of the meter 11 is accurately reproduced at the receiving station.

Figure 3:
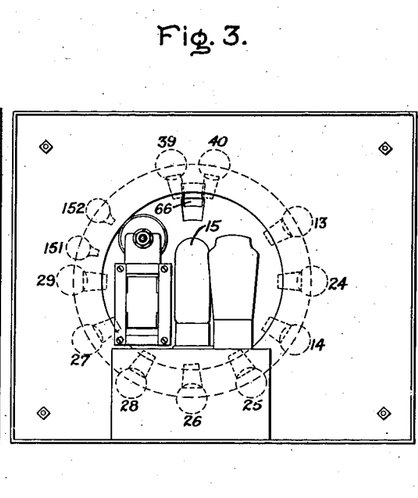
Figure 3 is an end view of the apparatus shown in Figure 2.
Figure 5:
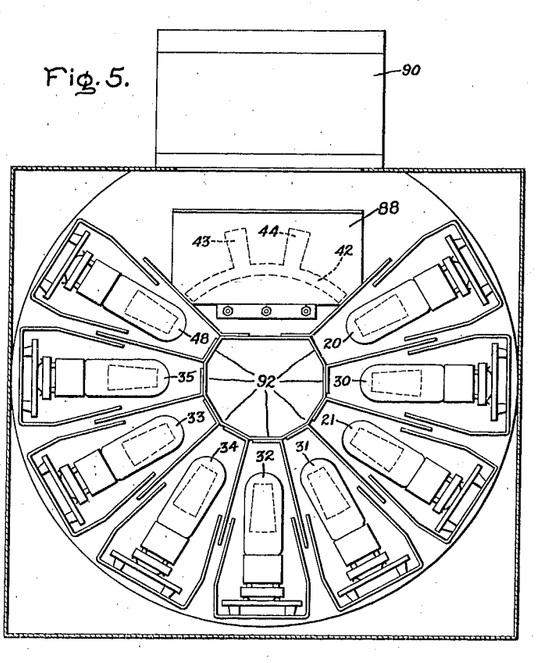
Figure 5 is an end view partially in cross section of the apparatus of Figure 4. Like reference characters are utilized throughout the drawings to designate like parts.

The remaining meters which may be provided at the transmitting station are not shown but for each of the additional meters there is a rotating contact device similar to the device 12 and a pair of lamps similar to lamps 13 and 14 arranged to be energized alternately in response to the rotation of the meter. For example, for the second meter, not shown, there is a pair of lamps 24 and 25, the connections of which have been omitted since they are similar to those of the lamps 13 and 14. For any additional meters there are additional pairs of lamps such as the lamps 26, 27, 28 and 29 shown in Figure 3 but not in Figure 1. The lamps at the transmitting station 10 are arranged around the periphery of a circle as shown in Figure 3. However, a gap is left in the circle for reasons which will be explained hereinafter. Corresponding to the lamps 24 and 25 for the second meter there is a pair of phototubes 30 and 31 at the receiving station 18, and corresponding to the lamps 26 to 29 (Fig. 3) for the additional meters there are additional phototubes such as the phototubes 32, 33, 34 and 35, as shown in Figure 5. The phototubes at the receiving station are also arranged around the periphery of a circle as shown in Figure 5 and a gap in the circle is left similar but not corresponding to the gap in the circle of lamps at the transmitting station, the angular positions of the corresponding lamps and phototubes being the same in order that the synchronously rotating single-aperture disks 16 and 23 will permit light flashes initiated by the lamps at the transmitting station to be picked up by corresponding phototubes at the receiving station.

If desired, the readings of the meters, such as the meter 11 at the transmitting station, for various power circuits may be totalized at the receiving station by providing a totalizing relay 36 which is represented by showing its actuating coils which are of the alternately operatable type to respond to the alternating light impulses produced by the three-wire contact 12. If desired, a printing demand meter 37 may be provided which is so connected as to be controlled by the totalizing relay 36 and to print records of the total power demand of the circuits metered by the meters controlling the totalizing relay 36. If desired, an alarm-contact-operating demand meter 38 controlled by the totalizing relay 36 may also be provided for giving an alarm when the demand of the combined circuits metered by the telemetering system exceeds a predetermined value. Of course, it will be seen that the same type of indications and controls may be obtained at the receiving station 18 as could have been obtained if the apparatus had been connected directly to the meter at the transmitting station 10.

In order that the synchronism of the disks 16 and 23 may be checked to prevent indications initiated by the wrong meter being picked up by the indicating dials at the receiving station, a pair of synchronizing lamps 39 and 40, is provided at the transmitting station 10. As shown in Figure 3, the lamps 39 and 40 are preferably spaced somewhat closer than the remaining lamps and occupy, but do not fully fill, the gap formed in the circle of lamps 13, 14, and 24 to 29. For checking the synchronism a synchronism-checking viewing screen 41 is provided at the receiving station and, as shown in Figure 5, occupies the gap in the circle of photoelectric tubes corresponding to that portion of the gap in the circle of lamps 13 to 29 occupied by lamps 39 and 40. The synchronism viewing screen 41 has an exposed area 42 corresponding in shape to a segment of an annulus, with two radially extending slot portions 43 and 44, having a radial dimension approximately equal to that of aperture 87 in disk 23. The annular segment portion 42 is so positioned that light flashes produced by the neon ring 19 appear in the space 42, and the notches 43 and 44 have the same angular positions as the synchronism checking lamps 39 and 40 at the transmitting station. The lamps 39 and 40 are continuously energized but cause light spots to be produced in the viewing screen 41 by virtue of the rotation of the single aperture disks 16 and 23 and the light spots will be at the angular position of, and will fill the notches 43 and 44 in the viewing screen 41 if the rotating disks are properly synchronized and have the same phase relation. If the rotating disk at the receiving station should fall out of step the light flashes will either not be visible at all in the viewing screen 41 or will be displaced in position from the notches 43 and 44. For correcting this situation, a mechanical phase shifter 46 is provided which permits changing the angular relationship between the disk 23 and the means for driving it.

In order to guard against continued or resumed operation of the indicators at the receiving station after a severe voltage surge or a voltage failure, an undervoltage relay 47 is provided which stops operation of the indicators and gives an alarm in order that the adjustment of the apparatus may be checked to guard against improper indications. In order to guard against improper indications due to lack of synchronism or to improper phase relationship between the rotating disks 16 and 23, a synchronism checking photoelectric tube 48 and a lock-out relay 49 are provided at the receiving station. The synchronism checking phototube 48 is placed in the same circle with the other phototubes 20, 21 and 30 to 35 but in an angular position not occupied by any lamp in the circle at the transmitting station, so that when the disks are in synchronism and in proper phase relation the synchronism checking phototube 48 remains dark. However, in case the disks fall out of phase sufficiently to cause improper actuation of any phototube, one of the lamps 13, 14, 24 to 29, 39 or 40, will cause a light flash to be produced at the angular position of the synchronism checking phototube 48 to energize the same. In a manner which will be explained hereinafter the lock-out relay 49 is tripped by the phototube relay 96 and stops the operation of the indicating devices at the receiving station until the apparatus is restored to synchronism. An alarm bell 50 is provided which is energized in a manner to be described hereinafter in case of any improper occurrence such as an excess demand recorded by the demand meter 38, voltage surge or failure indicated by the under-voltage relay 47, or lack of synchronism indicated by the lock-out relay 49, being operated by relay 96.

Considering the parts of the apparatus more in detail it will be seen that the meter 11, the reading of which is to be transmitted, includes a rotating induction disk 51 driven in a manner well understood to those skilled in the art at a speed proportional to the power traversing the circuit to which the meter 11 is connected. The three-wire contact 12, which is of a type well known to those skilled in the art, includes a rotating cam 52 connected directly or through gearing 53 to the rotating disk 51 of the meter 11. The three-wire contact 12 also includes a cam follower 54 carrying a movable contact 55 cooperating with a second movable contact 56, which is mechanically attached to a third movable contact 57 cooperating with a stationary contact 58 and as the cam follower 54 rises and falls with rotation of the cam 52, contact will be made alternately between the contacts 55 and 56 and between the contacts 57 and 58. Although I have referred to using a single-cam, three-wire contact, it will be understood that a double-cam, three-wire contact may also be used, in which there are two cam-operated movable contacts and one stationary contact cooperating with the movable contacts. For the purpose of minimizing the load carried by the three-wire contact 12, a pair of relays 59 and 60 may be provided which are energized by a source 61 and connect a current source 62 to the lamps 13 and 14 alternately as the two-circuit contact 12 changes from one position to the other.

In order to cause the rotatable disk 16 to be driven at a substantially uniform speed corresponding to the speed of the disk at the receiving station, a synchronous motor 63 is provided with its shaft connected to the disk 16 and its windings connected to the alternating current source 62. Likewise at the receiving station, a synchronous motor 64 is provided having a mechanical connection to the rotatable disk 23 and having its windings connected to an alternating current source 65. It will be understood that the ultimate source of power for the alternating current sources 62 and 65 will either be the same or the systems will be interconnected in order that synchronism between the circuits and the rotating disks 16 and 23 can readily be maintained.

Figure 2:
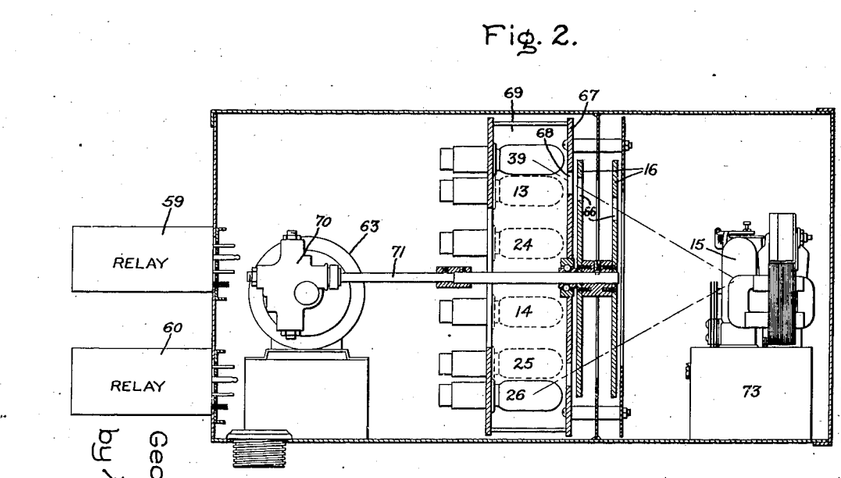
Figure 2 is an elevation partially in longitudinal section showing the apparatus at the transmitting station.

The disk 16 has been referred to as a single rotatable disk, but for the sake of greater effectiveness in shielding the phototube 15 against undesired light the disk 16 may actually be constructed in two parts, as shown in Figure 2, with apertures 66 arranged along a line from the circumference of the circle of lamps to the phototube 15, and a stationary disk 67 may be provided with a plurality of apertures 68 at the angular positions of the lamps at the transmitting station. Preferably the lamps 13, 14, 24 to 29, 39 and 40, at the transmitting station are placed in individual light-tight compartments which collectively form a light-tight box 69 of which the stationary disk 67 forms the front surface. As shown in Figure 2, reduction gearing 70 may be interposed between the synchronous motor 63 and the shaft 71 carrying the single aperture rotating disk 16. The arrangement may be such as to drive the disk 16 at any desired speed, there being practically no upward limit within the range of phototube response since rotating contacts are eliminated by the use of the phototube 15, but for transmitting meter readings I have found the speed of 15 revolutions per minute to be satisfactory inasmuch as watthour meters of the types now commercially used may be so designed that at their maximum speed a contact will be maintained for at least 12 seconds between one pair of contacts of the three-wire contact 12 before the circuit is broken and a contact will likewise be maintained for at least 12 seconds between the other pair of contacts of the three-wire contact 12 before the circuit is broken. The relays 59 and 60 may, if desired, be of the type customarily used in the telephone art. The lamps 13, 14, 24 to 29, 39 and 40 may conveniently be incandescent lamps of the usual commercial type.

Although I have shown the use of the telephone wire 17 for transmitting the indications from the transmitting station 10 to the receiving station 18 it will be understood that my invention is not limited to this precise arrangement and that any desired type of communication channel may be employed such as phantom circuits, carrier current channels or radio waves since the apparatus operates merely by transmitting impulses. If a telephone circuit is used it will be understood that the usual protective appliances may be employed for protecting other telephone circuits and preferably an insulating transformer 72 is interposed between the alternating current supply source 62 and the circuits of the phototube 15.

For converting the light impulses applied to the phototube 15 into electrical impulses, a phototube relay 73 is provided which is energized by the transformer 72 and, in turn, energizes (or de-energizes) the telephone wire 17 in synchronism with the light impulses. For the purpose of restricting the impulses to direct current impulses, to permit the use of a direct current relay at the receiving station, a full-wave copper oxide rectifier 74 may be interposed in the output circuit of the phototube relay 73, ground return being employed for completing the circuit of the telephone wire 17. Although the arrangement may either be such that the communication channel 17 is energized during periods when the lamps at the transmitting station are bright or such that the channel is energized during periods when the lamps are dark, the output circuit of the relay 73 is preferably connected so that the communication channel 17 is continuously energized except when light impulses are received by the phototube 15. This arrangement gives an immediate alarm in the event of communication channel failure and furthermore provides for an alarm in the event of a voltage surge at the transmitter of sufficient magnitude to affect the speed and thereby the phase angle of the motor 63. This alarm is accomplished by means of a quick-opening, slow-closing time delay relay 75 which is arranged to open the supply circuit to rectifier 74 in the event of such a voltage surge and to reclose it only after a time delay of sufficient length to permit one complete revolution of disk 23 at the receiving station 18. During this revolution, the light source 19 remains lit continuously thereby operating the photocell 48, the relay 96, the relay 49 and the alarm bell 50. For protection of the line 17 a line protector in the form of a resistor 76 may be employed, and a switch 77 may be provided for disconnecting the line 17 when the apparatus is not in use.

It will be understood that the phototube relay 73 is one of the type well known to those skilled in the art having an input power circuit 78 and output leads 79 between which a circuit is made and broken in response to illumination or darkening or vice versa of the phototube 15, and the relay 73 need not, therefore, be described in detail.

At the receiving station, in order to obviate the necessity for carrying appreciable power on the telephone wire 17, a normally closed impulse relay 80, which may be a direct current relay, is provided having contacts 81 which control the input from the alternating current power source 65 to a neon lamp transformer 82 to which is connected the neon ring 19.

Figure 4:
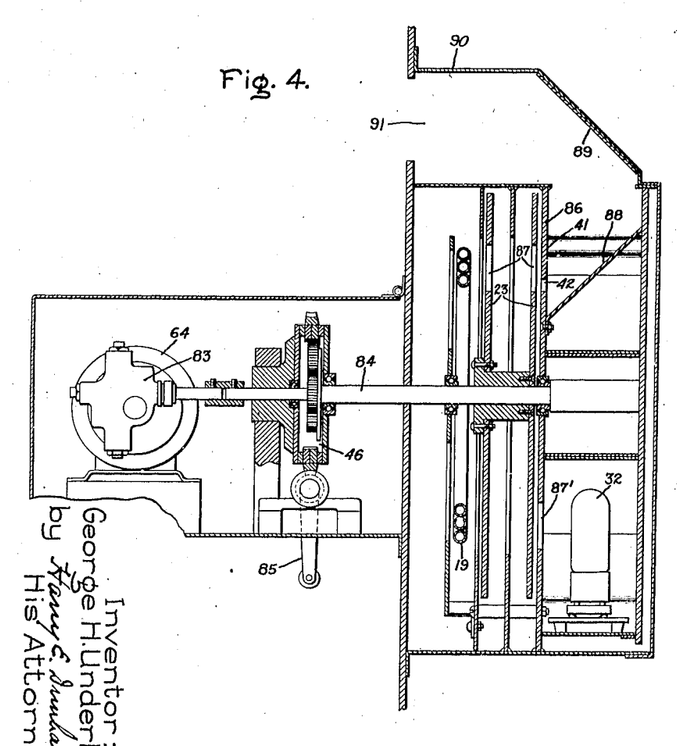
Figure 4 is an elevation partially in longitudinal section showing a portion of the apparatus at the receiving station.

As shown in Figure 4 a speed reduction gearing 83 may be interposed between the synchronous motor 64 and the shaft 84 to which the single aperture rotating disk 23 is connected, and, in order to permit varying the phase relationship between the disk 23 and the synchronous driving motor 64, a mechanical phase shifter 46 is interposed between the reduction gearing 83 and the shaft 84. The mechanical phase shifter 46 may be of any desired type being shown as a planetary gear box with a rotatable housing which may be adjusted in angular position by means of a suitable handle 85.

In order to prevent interference from stray light, the optical apparatus at the receiving station is also enclosed in a suitable light-tight housing. A stationary disk 86 is provided forming a front face of the light-tight box enclosing the neon ring 19 and the rotating disk 23. The latter is preferably also divided into two parts each having a single aperture 87. The stationary disk 86 is provided with a plurality of apertures 87' arranged around the periphery of the circle and corresponding in angular position to the photoelectric tubes 20, 21, 30 to 35 and 48. The opening 42 with the slots 43 and 44 which together form the synchronism viewing screen 41 is also cut into the stationary disk 86, and to permit observing the synchronism checking screen 41 from the back of the apparatus, mirrors 88 and 89 are provided in a hood 90 in which an observation window 91 is formed to reflect an image of the opening 42 and slots 43 and 44 visible to an observer placing his eye at the window 91. The phototubes 20, 21, 30 to 35 and 48 are preferably placed in independent light-tight enclosures 92 adjacent to the stationary disk 86 as shown in Figs. 4 and 5.

Figure 1:
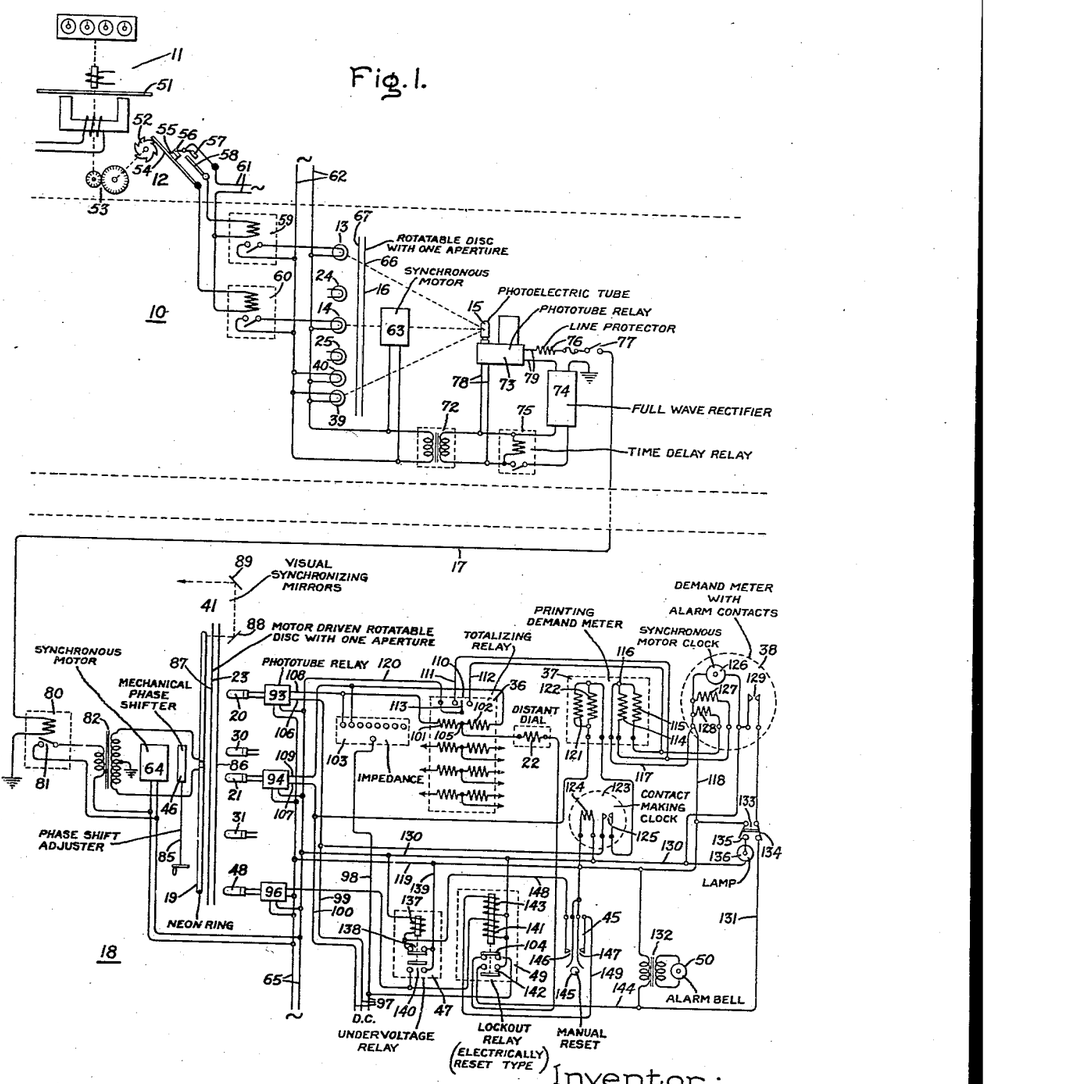
Figure 1 is a circuit diagram schematically representing one embodiment of my invention.

The phototubes at the receiving station are provided with phototube relays of the type well known to those skilled in the art and need not be described in detail, those for the phototubes 20, 21 and 48 being represented in Fig. 1 by the rectangles 93, 94 and 95, respectively. The phototube relays 93 to 96 are energized by the alternating current source 65 and are connected to control a three-wire direct current source 97 which, in the particular embodiment illustrated, is shown as consisting of a neutral wire 98, a 62½ volt negative wire 99, and a 62½ volt positive wire 100. Each pair of phototube relays corresponding to one of the pairs of lamps and to one of the meters at the transmitting station 10 is arranged to control both sides of the three-wire source 97 for operating a pair of coils of the totalizing relay 36. For example, the phototube relays 93 and 94, which correspond to the lamps 13 and 14 and the meter 11 at the transmitting station 10, are connected with their output terminals in circuit with the operating coils 101 and 102 respectively of the totalizing relay 36, which is shown with three additional pairs of operating coils, the connections of which are not completed but which would actually be connected in circuit with additional pairs of phototube relays. If desired, an impedance box 103 may be provided for improving the operation of the totalizing relay 36, the impedance box consisting merely of a plurality of impedances, each with a mid terminal for connection with the wire 98 and with end terminals for connection across one of the pair of totalizing relay operating coils, such as the coils 101 and 102. The neutral wire 98 is connected in series with normally closed contacts 104 of the lock-out relay 49 and the operating coil of the distant dial 22 to the mid or common terminal 105 of the pair of operating coils 101 and 102 of the totalizing relay 36. The negative side 99 of the direct current source 97 is connected to one of the output terminals 106 of the phototube relay 93 and the positive side 100 of the direct current source 97 is connected to one of the output terminals 107 of the phototube relay 94. The other two output terminals 108 and 109 of the phototube relays 93 and 94 are connected to the outer ends of the totalizing relay operating windings 101 and 102 respectively.

The distant dial, represented by its actuating coil 22, may be of any desired known type in which there is a register connected to a ratchet, driven by a pawl carrying an armature oscillated by an actuating coil responsive only to impulses of alternately opposite polarity.

The totalizing relay 36 may be of any desired type having pairs of alternately energizable operating windings, one pair for impulses corresponding to each reading to be totalized, and also having a three-wire contact device 110 for alternately changing connections from one lead 111 to another lead 112 at the rate of alternation corresponding to the total power represented by the impulses supplied to the energizing windings. The three-wire contact 110 is thus analogous in its effect on apparatus controlled thereby to the three-wire contact 12 which is customarily supplied with watthour meters which are intended to produce impulses at a rate corresponding to the magnitude of the power. The three-wire contact 110 of the totalizing relay 36 includes also a movable contact 113 which is brought into contact with one or the other of the leads 111, 112. The totalizing relay 36 may, for example, be of the type described in pages 18 and 19 of the serial article entitled "Metering of combined power and lighting circuits" by E. J. Boland, originally published in the General Electric Review for February, March and April 1932.

If it is desired to print records of the total power demand represented by the total power measured by the meters controlling the totalizing relay 36, a printing demand meter 37 may be provided, and if it is desired to obtain an alarm in case a predetermined demand is exceeded, a demand meter 38 with alarm contacts may be provided. The printing demand meter 37 and the alarm-contact demand meter 38 have alternately energizable operating coils which may be connected to and controlled by the three-wire contactor 110 of the totalizing relay 36 in the same manner as would be done if the printing demand meter 37 and demand meter 38 were directly connected to the three-wire contact device 12 of the meter 11 at the transmitting station.

Since the printing demand meter 37 may be of any desired construction and this apparatus in itself does not form a part of my invention it is not described or illustrated in detail. It may, if desired, be of the type illustrated in Patent No. 1,742,072 to Chester I. Hall and is represented as having a pair of operating coils 114 and 115 connected to the leads 111 and 112 respectively of the three-wire contact device 110 of the totalizing relay 36, the mid connection 116 of the operating coils 114 and 115 being connected through the conductors 117, 118 and 119 to the left-hand conductor of the alternating current circuit 65, and the movable contact 113 of the three-wire contact device 110 of the totalizing relay 36 being connected through the conductor 120 to the right-hand conductor of the alternating current circuit 65. The printing demand meter 37 includes also an energizing coil 121 for the printing mechanism and a reset coil 122 for restoring a printing type wheel, not shown, to zero at the end of predetermined time intervals. There is a contact-making clock 123 which is associated with the printing demand meter 37, and includes a synchronous motor 124 energized by the alternating current source 65 for operating the clock and a pair of contacts 125 which are closed by the clock mechanism at predetermined intervals for connecting the coils 121 and 122 to the direct-current circuit 97.

The alarm-contact-operating demand meter 38 may also be of the type well known to those skilled in the art such as those described in United States Patents 1,710,681 Bean, and 1,603,051 Hall, and sold by the General Electric Company under the trade designation GMS 10, for example, having a pair of movable arms, not shown, one of which is advanced by a synchronous clock motor 126, the other of which is advanced by a ratcheting mechanism controllable by alternately energizable coils 127 and 128 in a manner analogous to the operation of the coils 101 and 102 of the totalizing relay 36. The operating coils 127 and 128 are connected in the same manner as the operating coils 114 and 115 of the demand meter 37. The said movable arms of the demand meter 38 are so arranged that, in case the demand is excessive, the arm advanced by the energizing coils 127 and 128 overtakes the other arm and closes the pair of contacts 129, one of which is connected to the right-hand conductor of the alternating current source 65 by the conductor 130 and the other of which is connected through the conductor 131, an alarm bell transformer 132, and the conductor 119 to the other side of the alternating current source 65. The alarm bell 50 is connected on the output side of the transformer 132. For the purpose of stopping the ringing of the alarm bell due to excessive power demand a transfer switch 133 is provided having a normally closed contact 134 in the line 131 and having a normally opened contact 135 in series with an alarm indicating lamp 136 and the conductors 119 and 130 leading to the alternating current source 65. It will be understood, however, that I am not limited to the precise connection and that the normally closed contact 134 may be in series with the transformer 132 instead of in the line 131, when it is desired to be able to stop ringing due to any cause.

The under-voltage and alarm relay 47 has an energizing coil 137 connected across the alternating current source 65, through the conductor 130 on one side, and the contacts 138 and conductors 139 and 119 on the other side. The under-voltage relay 47 is so arranged that the winding 137 holds the contacts 138 closed so long as adequate voltage is applied to the winding 137. The contacts 138 thus form a hold-in circuit for the relay 47. The relay 47 is provided with a second pair of contacts 140 arranged to be closed when the coil 137 is deenergized and, as will be explained hereinafter, the contacts 140 are connected to the energizing winding 141 of the lock-out relay 49.

The lock-out relay 49 is of the electrically reset type having the normally closed contacts 104 adapted to be opened when the winding 141 is energized and adapted then to remain open whether the winding 141 remains energized or not. The lock-out relay 49 also has a pair of normally open contacts 142 and a resetting winding 143 which closes the contacts 104 and opens the contacts 142 when it is energized. The normally open contacts 142 are connected between the conductor 130 on one side of the A. C. source 65 and a conductor 144 leading through the alarm operating transformer 132 to the conductor 119 and back to the other side of the alternating current source 65.

The manual reset 45 includes a push-button 145 and a pair of normally open contacts 146, 147. The contacts 146 are connected between the conductor 119 of the A. C. source 65 and the conductor 148 leading through the voltage alarm relay coil 137 back to the other conductor 130 of the A. C. source 65. The normally open contacts 147 of the manual reset 45 are connected between the conductor 119 of the A. C. source 65 and a conductor 149 leading through the lock-out relay resetting coil 143 back to the other conductor of the A. C. source 65.

In order to explain the operation of the apparatus, the cycle of events will be traced through for an operation of the three-wire contact device 12 driven by the meter 11. When the meter 11 has measured an increment of electrical energy sufficient to cause rotation of the cam 52 an angular distance corresponding to the angular space of the cams, the cam follower 54 will change from one extreme position to the other, thus causing the lamp 13 to be illuminated and the lamp 14 to be extinguished through the relays 59 and 60. Since the single aperture rotating disk 16 makes at least one complete rotation within the time that the lamp 13 is illuminated, during this time a light impulse will be transmitted to the phototube 15 causing an interruption in the direct-current transmitted through the wire 17 and thereby deenergizing the normally closed relay 80 and producing a light flash of the neon ring 19 during the period that the aperture 66 of the disk 16 is in front of the lamp 13. Since the disks 16 and 23 are synchronized, the photoelectric tube 20 will be exposed to the illumination of the neon ring 19 during the time that the lamp 13 at the transmitting station shines upon the photoelectric tube 15. Accordingly, an electrical impulse will be supplied to the energizing coil of the distant dial 22 and to the operating coil 101 of the totalizing relay 36. If the lamp 13 remains illuminated for a considerable period of time due to the slow operation of the meter 11, additional light flashes will be produced as the aperture 66 of the disk 16 again passes the lamp 13. However, there will be no effect upon the distant dial 22 since successive impulses have the same polarity as the original, nor upon the totalizing relay 36 since the operating winding 101 has already been energized and moved its armature.

After the meter 11 has measured sufficient additional energy to cause the three-wire contact 12 to advance to a position extinguishing the lamp 13 and energizing the lamp 14, the next time the aperture 66 of the disk 16 passes the lamp 14 the light impulse acting upon the phototube 15 produces a light flash of the neon ring 19 in the manner already explained and supplies a light impulse to the photoelectric tube 21 corresponding to the lamp 14. Thereupon an electric impulse will pass through the distant dial 22 and the operating winding 102 of the totalizing relay 36 causing the distant dial to be notched up a distance corresponding to the distance of rotation of the meter 11 and causing the armature of the coil 102 to pick up, traveling in the opposite direction from the armature of the coil 101.

Successive operations of the three-wire contact 12 of the meter 11 will produce successive alternate energization of the operating windings 101 and 102 of the totalizing relay 36, thus advancing this mechanism and causing alternate operations of the three-wire contact 110 of the totalizing relay 36 depending in number upon the ratio between the input and output impulses for which the totalizing relay 36 is designed. When the movable contact 113 of the three-wire contact 110 operates back and forth it will alternately energize the windings 114 and 115 of the printing demand meter 37 so as to advance the demand dial of the printing demand meter and give an indication or reading representing the number of electric impulses received during a predetermined time period, which, in turn, represents the number of increments of electrical energy measured by the meter 11 during the same time period, i. e., the power demand.

In a similar manner the operating coils 127 and 128 of the demand meter 38 are operated and if the demand exceeds a predetermined value the contacts 129 are closed, closing the circuit through the alarm bell 50. If the alarm transfer switch 133 is moved to the right the contacts 135 are closed and contacts 134 are opened, stopping the bell but connecting the lamp 136 through the lines 119 and 130 across the alternating-current source 65, thus lighting the lamp 136 to show that the cause for producing an alarm has not been removed.

The expression "indicating device" has been utilized in the claims to refer generally to devices of any kind for producing readings of or responses to measurements or indications, including registers, recorders and relays as well as deflecting-pointer types of devices.

In the foregoing discussion it has been assumed that the single aperture rotating disks 16 and 23 are rotating synchronously in the proper phase relationship. If it is desired to check this relationship, the operator makes an observation from the window 91 of the receiving station to determine whether or not the light flashes produced by the neon ring 19 when the aperture 66 of the transmitter disk 16 passes the lamps 39 and 40 appear out of angular position with relation to the notches 43 and 44 in the viewing screen 41. If the position of the light flashes does not coincide with the angular position of the notches 43 and 44, the phase angle is adjusted by rotating the handle 85 in one direction or another to restore the phase relationship to the proper value. However, if the phase relationship alters more than a slight amount from the proper relationship the apparatus is shut down by the lock-out relay 49 in a manner which will be explained hereinafter.

Normally the light flashes produced at the receiving station due to the lamps 39 and 40 at the transmitting station appear in the viewing screen 41 where there are no photoelectric tubes, and the light flashes produced by the other lamps at the transmitting station appear in the angular positions of the photoelectric tubes 20, 21 and 30 to 35 but not in the angular position of the photoelectric tube 48. However, in case the disk 23 should fall even very slightly out of the proper phase relationship, the light flashes produced by lamps at the transmitting station will be changed enough in angular position so that one of these light flashes will appear in the position of the check photoelectric tube 48. One light impulse directed to the photoelectric tube 48 will cause energization of the photoelectric relay 90 which, in turn, will cause the winding 141 of the lock-out relay 49 to be energized thus opening the contacts 104 and closing the contacts 142. The operation of the totalizing relay 36 and the distant dial 22 is thereupon stopped. The closing of the contacts 142 causes energization of the alarm bell 50, warning the operator at the receiving station.

After restoring the disks to synchronism and the proper phase relationship by means of manipulation of the handle 86 in the manner previously explained, the operator operates the push button 145 of the manual reset switch 45 thus closing the contacts 146 and 147. Closure of the contact 147 energizes the resetting coil 143 of the lock-out relay 49, permitting the contacts 104 to close and the contacts 142 to open, and restoring the apparatus to normal operation. In a similar manner, in case there has been a voltage failure the manual reset 45 closes the contact 146 to energize the winding 137 of the under-voltage relay 47 and permit simultaneous restoration of the lock-out relay 49 to its normal operating position.

If desired a pair of constantly illuminated lamps 151 and 152 may be mounted close to, and on either side of, the normally dark spot in the transmitter stationary disk corresponding to the receiver tube 48 in order to provide for quick shut down (within one revolution) in the event of slight phase displacement instead of waiting, as would otherwise be the case, until one of the other lamps 13, 14, 24 to 29, 39 or 40 happens to be illuminated during the time when the photocell 48 is exposed to the lamp 19 by the aperture in the disk 23.

If it should be desired to provide synchronization between the operation of the printing and reset coils of a demand meter located at the transmitting station with the operation of the printing and reset coils 121 and 122 of the demand meter 37 at the receiving station, both being actuated from a master clock located at one station, preferably at the transmitter, another lamp and photocell at the transmitting station and another lamp and photocell at the receiving station may be provided for the purpose. Such synchronization may be accomplished without recourse to telemeter control where there is 60 cycle interconnection between the transmitter and receiver since the contact making clocks utilize synchronous motors.

Although I have explained apparatus in which phase error or lack of synchronism produces an alarm and the apparatus is corrected and reset manually it will be understood that my invention is not limited thereto but obviously includes apparatus in which the phase angle of the rotating disks may be corrected automatically by operation of the checking phototube 48. For example, an adjusting motor energized by the phototube relay 96 may be coupled to the handle 85 to correct phase angle, or if two-way correction is desired, photocells arranged on either side of the viewing screen 41 may be arranged to energize one or the other of two opposite-direction controlling windings of a reversible motor connected to the adjusting handle 85. For obtaining both coarse and fine adjustment automatically an extra pair of coarse-adjustment checking phototubes may be provided beyond the first pair of photocells on either side thereof, and arranged to run the adjusting motor at high speed until synchronism is approached closely enough to illuminate one or the other of the first pair of checking photocells or fine adjustment photocells. Interlocks between the relays controlled by the coarse-adjustment photocells will preferably be provided so that the adjusting handle 85 will be continuously driven in a given direction until proper phase angle is restored.

In case it is not possible to utilize synchronous or interconnected A. C. circuits for energizing the motors 63 and 64 and it is necessary to utilize a direct current motor at 64, a speed adjusting rheostat may be provided therefor which is driven by or in response to the said phase adjusting motor which may be connected to the handle 85.

It will be understood that the remaining operating coils of the totalizing relay 36 are connected in a similar manner as the operating coils 101 and 102 in relation to the circuits of the remaining photoelectric relays, some of which are not shown in Fig. 1, and that the operation of the additional lamps and photoelectric relays, the connections some of which are not shown, correspond to the operation of the lamps 13 and 14, photoelectric tubes 20 and 21 and operating coils 101 and 102.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. A multiplex telemetering system comprising at a transmitting station a plurality of pairs of light sources, means for alternately energizing the light sources of each pair at a rate of alternation dependent upon one of a plurality of measurements to be transmitted, a light responsive relay, shutter means for normally shielding said relay from said light sources but for exposing said relay to each of said light sources in rotation during repeated cycles, the rate of repetition of said cycles of exposure being of a greater order of magnitude than the rate of alternation of illumination of said pairs of light sources for the largest measurements to be transmitted, and a source of energy, an energy transmission medium extending from the transmitting station to a receiving station and connected to said source of energy under control of said light responsive relay, at a receiving-station a light source, means controlled by said energy transmission medium for intermittently energizing said receiving-station light source, a plurality of light responsive relays adapted to be illuminated by said light source, a second shutter means for normally shielding said latter mentioned relays from said receiver light source but for exposing each of said receiving station relays from said receiver light source in rotation during repeated cycles, a plurality of indicating devices, and means responsive to each of said pairs of receiver light-responsive relays for operating one of said indicating devices in response to the rate of energization of the corresponding pair of receiver light-responsive relays.

2. A multiplex telemetering system comprising at a transmitting station, a light responsive relay, means for subjecting said relay to a plurality of independently controlled light flashes in rotation during repeated cycles, each of said light flashes being produced intermittently at a rate dependent upon the magnitude of a quantity to be telemetered, the rate of repetition of said cycles being of a greater order of magnitude than the rate of flashing of said light flashes corresponding to the maximum value of any one of said quantities to be telemetered, an energy transmission medium controlled by said light responsive relay, at a receiving station a light source operatively connected to said energy transmission medium and adapted to be intermittently energized in response thereto, a plurality of receiver light responsive relays adapted to be illuminated by said receiver light source, means for causing said relays to be illuminated by said light source in rotation, and a plurality of indicating devices separately controlled by said light source and adapted to be energized thereby to produce readings dependent upon the rate of energization of said light responsive relays.

3. A telemetering system comprising at a transmission station, a light source adapted to become illuminated intermittently at a rate dependent upon the magnitude of the quantity to be telemetered, a light responsive relay, movable shutter means for intermittently exposing said relay to said light source, means for driving said shutter means at a substantially uniform speed, a transmission circuit controlled by said light responsive relay, at a receiving station a light source operated by said transmission circuit for intermittently producing illumination of the latter light source at a rate corresponding to the rate of illumination of the first of said light sources, second and third light responsive relays, an indicating device responsive to the second of said light responsive relays adapted to be operated to produce indications dependent upon the rate of energization of said second light responsive relay, movable shutter means for intermittently exposing said second light source to said second relay, means for driving said second shutter means at a rate of speed substantially equalling the rate of the first mentioned shutter means, said second light responsive relay being located in such a position as normally to be exposed to light from the second source by the second shutter means when the first relay is exposed to light from the first source by the first shutter means, means controlled by the third of said light responsive relays for producing a response in case of lack of phase coincidence of operation of said shutter means, said third light responsive relay being in a position normally kept dark by said shutter means but illuminated when said shutter means fall out of phase coincidence.

4. A telemetering system comprising at a transmission station, a light source adapted to become illuminated intermittently at a rate dependent upon the magnitude of the quantity to be telemetered, a second light source and a light responsive relay, moving shutter means for intermittently exposing said relay to said light sources in alternation, means for driving said shutter means at a substantially uniform speed, a transmission circuit controlled by said light responsive relay, at a receiving station a light source operated by said transmission circuit for intermittently producing illumination of the latter light source at a rate corresponding to the rate of illumination of the first of said light sources, a second light responsive relay, an indicating device responsive to the second of said light responsive relays adapted to be operated to produce indications dependent upon the rate of energization of said second light responsive relay, moving shutter means for said second light source, means for driving said second shutter means at a rate of speed substantially equalling the rate of the first mentioned shutter means, means at the receiving station for observing the position of the light flashes produced in synchronism with the flashes of said first light responsive relay by said second light source at the transmitting station for the purpose of comparing the relative positions in the operating cycle at which said shutter means expose said relays to the corresponding light sources, and means for shifting the phase relation between the shutter means at the transmitting and receiving stations.

5. In a telemetering system a pair of photoelectric tubes adapted to be illuminated alternately at a rate depending upon the magnitude of a quantity to be telemetered, a three-wire source of direct current having a neutral conductor and positive and negative conductors, a relay having a pair of windings connected in series and adapted to be operated by application of current impulses to said windings alternately, a distant dial having an actuating coil adapted to advance the dial in response to current impulses of alternately opposite polarity, said actuating coil being connected between the common point of said relay windings and the neutral of said direct current source, and relay means controlled by said photoelectric tubes for connecting the remaining end of one or the other of said relay windings to the positive or the negative conductor of said direct current source in response to illumination of one or the other of said photoelectric tubes, respectively.

6. In a telemetering system in which pairs of impulses are transmitted at a rate depending upon the magnitude of a quantity to be telemetered, a three-wire source of direct current having a neutral conductor and positive and negative conductors, a relay having a pair of windings connected in series and adapted to be operated by application of current impulses to said windings alternately, a distant dial having an actuating coil adapted to advance the dial in response to current impulses of alternately opposite polarity, said actuating coil being connected between the common point of said relay windings and the neutral of said direct current source, and apparatus controlled by such transmitted impulses alternately for alternately connecting the remaining end of one or the other of said relay windings to the positive or the negative conductor, respectively, of said direct current source.

GEORGE H. UNDERHILL.